(12) United States Patent
Selstad et al.

(10) Patent No.: US 9,752,507 B2
(45) Date of Patent: Sep. 5, 2017

(54) AIRCRAFT SYSTEM WITH FUEL-TO-FUEL HEAT EXCHANGER

(71) Applicant: United Technologies Corporation, Hartford, CT (US)

(72) Inventors: Tyler J. Selstad, West Harford, CT (US); Timothy J. Gaudet, Southampton, MA (US)

(73) Assignee: United Technologies Corporation, Farmington, CT (US)

( * ) Notice: Subject to any disclaimer, the term of this patent is extended or adjusted under 35 U.S.C. 154(b) by 225 days.

(21) Appl. No.: 14/618,801

(22) Filed: Feb. 10, 2015

(65) Prior Publication Data

US 2016/0230669 A1    Aug. 11, 2016

(51) Int. Cl.
*F02C 7/14*   (2006.01)
*F02C 7/224*   (2006.01)

(52) U.S. Cl.
CPC .............. *F02C 7/224* (2013.01); *F02C 7/14* (2013.01); *F05D 2260/213* (2013.01); *Y02T 50/675* (2013.01)

(58) Field of Classification Search
CPC .... F02C 6/18; F02C 7/14; F02C 7/224; F05D 2260/205; F05D 2260/213
See application file for complete search history.

(56) References Cited

U.S. PATENT DOCUMENTS

| | | | |
|---|---|---|---|
| 5,544,700 A * | 8/1996 | Shagoury | F02C 7/14 165/139 |
| 6,206,090 B1 * | 3/2001 | Rago | B01D 29/15 165/119 |
| 6,939,392 B2 | 9/2005 | Huang et al. | |
| 7,231,769 B2 | 6/2007 | Spadaccini et al. | |
| 7,260,926 B2 | 8/2007 | Sabatino et al. | |
| 7,465,335 B2 | 12/2008 | Schmidt | |
| 7,744,827 B2 | 6/2010 | Vanderspurt et al. | |
| 7,983,541 B2 * | 7/2011 | Clements | F02C 7/224 392/471 |
| 8,522,572 B2 * | 9/2013 | Coffinberry | B64D 13/06 165/235 |
| 2014/0216003 A1 | 8/2014 | Phillips et al. | |
| 2014/0338334 A1 * | 11/2014 | Karam | F02C 7/224 60/726 |
| 2016/0297538 A1 * | 10/2016 | Soriano | B64D 37/00 |

* cited by examiner

*Primary Examiner* — Arun Goyal
(74) *Attorney, Agent, or Firm* — O'Shea Getz P.C.

(57) ABSTRACT

An aircraft system is provided that includes a fuel reservoir, a turbine engine and a fuel-to-fuel heat exchanger. The heat exchanger is fluidly coupled between the fuel reservoir and the turbine engine.

15 Claims, 5 Drawing Sheets

AIRCRAFT SYSTEM WITH FUEL-TO-FUEL HEAT EXCHANGER

BACKGROUND OF THE INVENTION

1. Technical Field

This disclosure relates generally to an aircraft system and, more particularly, to a fuel system for delivering fuel to components of a turbine engine.

2. Background Information

Various fuel system types and configurations are known in the art for an aircraft. One such fuel system includes a fuel reservoir and a pump arranged with an airframe of the aircraft. This fuel system also includes a fuel management system arranged with a turbine engine. The fuel management system conditions and delivers fuel, received from the fuel reservoir and the pump, to an injector system for injection into a combustor.

Under certain conditions, ice may build up on the fuel lines running from the fuel reservoir to the turbine engine. Some of this ice may dislodge during operation and flow with the fuel from the fuel reservoir through the pump and into the turbine engine's fuel management system. Large amounts of ice may clog or otherwise hinder operation of one or more fuel management system components, which may lead to diminished or complete loss of turbine engine thrust.

There is need in the art for an improved fuel system which can prevent formation of ice in the fuel lines.

SUMMARY OF THE DISCLOSURE

According to an aspect of the invention, an aircraft system is provided that includes a fuel reservoir, a turbine engine and a fuel-to-fuel heat exchanger. The heat exchanger is fluidly coupled between the fuel reservoir and the turbine engine.

According to another aspect of the invention, another aircraft system is provided that includes a fuel reservoir, a fuel management system and a fuel-to-fuel heat exchanger. The fuel management system includes a boost pump, a main pump and an injector. The heat exchanger fluidly coupled between the fuel reservoir and the fuel management system.

According to still another aspect of the invention, another aircraft system is provided that includes a fuel reservoir, a turbine engine and a fuel-to-fuel heat exchanger. The heat exchanger includes a supply flow path and a return flow path. The supply and the return flow paths are fluidly coupled in parallel between the fuel reservoir and a component of the turbine engine.

The heat exchanger includes a first flow path and a second flow path. The first and the second flow paths are fluidly coupled in parallel between the fuel reservoir and the fuel management system.

A turbine engine may include the fuel management system. The heat exchanger may be remotely located from the turbine engine.

An airframe may be included within which the heat exchanger is configured.

The heat exchanger may be remotely located from the turbine engine.

The heat exchanger may be arranged within an airframe. The turbine engine may be mounted to the airframe.

The heat exchanger may be adapted to direct supply fuel from the fuel reservoir to the turbine engine. The heat exchanger may also be adapted to direct return fuel from the turbine engine to the fuel reservoir.

The heat exchanger may be adapted to receive fuel from the fuel reservoir. The heat exchanger may also be adapted to receive fuel from the turbine engine.

The heat exchanger may be adapted to provide the fuel received from the fuel reservoir to the turbine engine.

The heat exchanger may be adapted to provide the fuel received from the turbine engine to the fuel reservoir.

The heat exchanger may be configured as a counter-flow heat exchanger.

The heat exchanger may include a first flow path and a second flow path. The first flow path and the second flow path may be fluidly coupled in parallel between the fuel reservoir and a component of the turbine engine.

The heat exchanger may include a first flow path and a second flow path with a plurality of sub-flow paths distributed about the first flow path.

The heat exchanger may include a conduit, which includes a central bore and a plurality of channels. The channels may be embedded within a sidewall of the conduit.

The heat exchanger may include a first manifold and a second manifold. The channels may extend between the first manifold and the second manifold.

The turbine engine may include a fuel management system, which includes an inlet and an outlet. The inlet may be fluidly coupled with the bore. The outlet may be fluidly coupled with the channels.

An airframe may be included. The heat exchanger may be arranged within the airframe. The turbine engine may be attached to the airframe.

The heat exchanger may be remotely located from the turbine engine.

The foregoing features and the operation of the invention will become more apparent in light of the following description and the accompanying drawings.

DETAILED DESCRIPTION OF THE INVENTION

Figure 1:
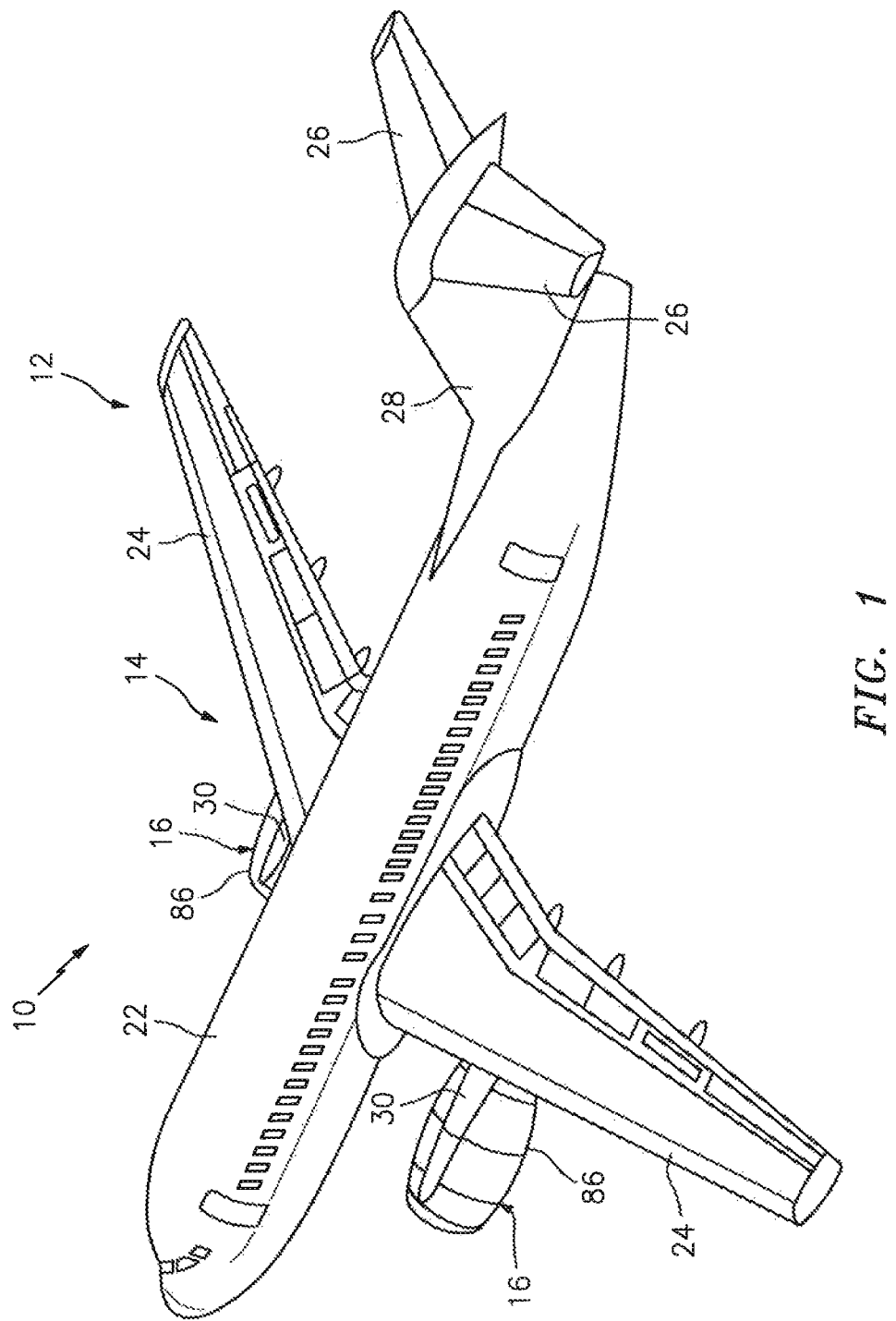
FIG. 1 is a perspective illustration of an aircraft.
Figure 2:
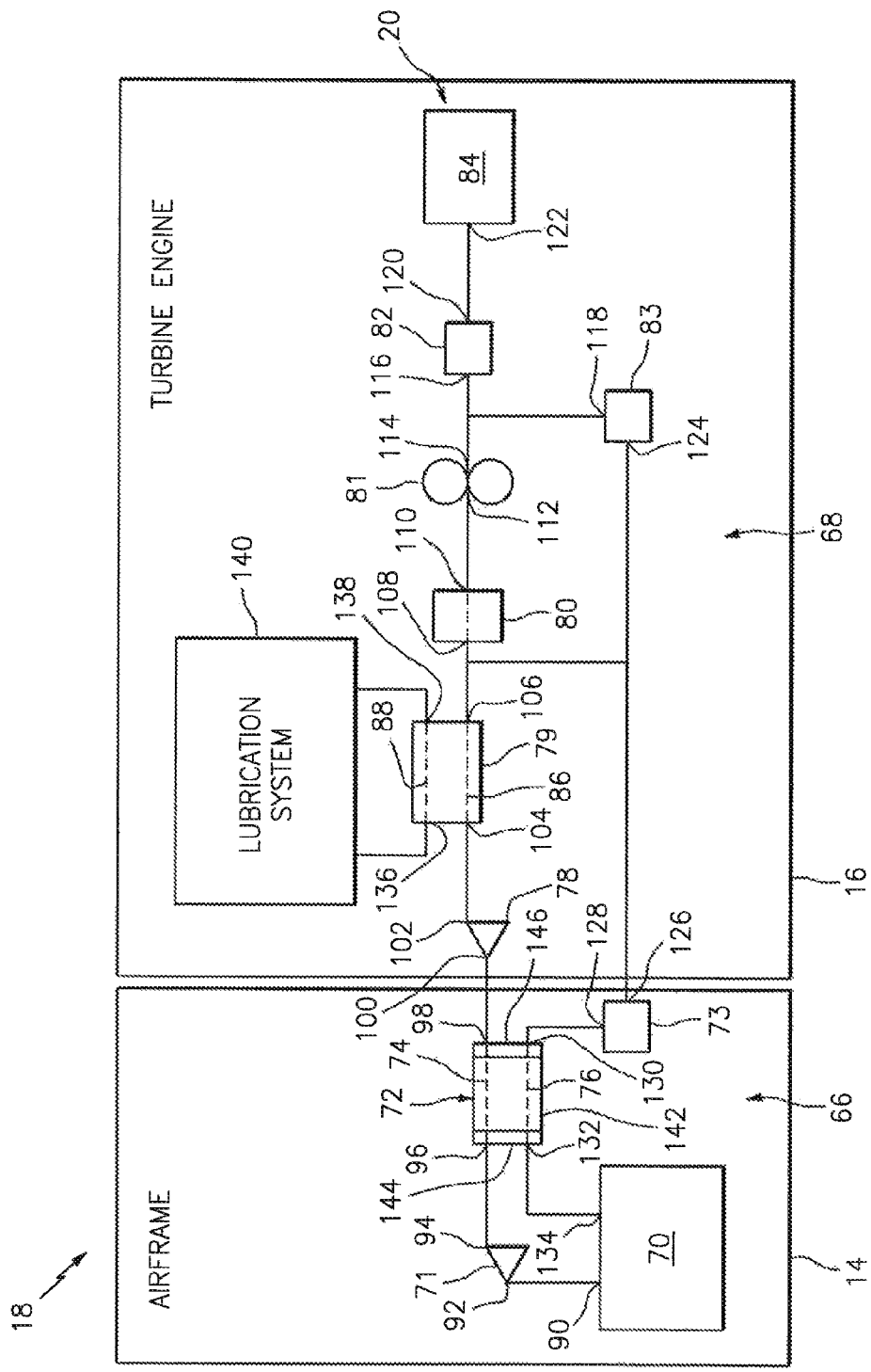
FIG. 2 is a schematic illustration of a fuel system for the aircraft.

FIG. 1 illustrates an aircraft system 10 configured for an aircraft 12, for example an airplane or a jet plane. The aircraft system 10 includes an airframe 14 and a plurality of turbine engines 16. Referring to FIG. 2, the aircraft system 10 also includes a dedicated fuel system 18 for delivering fuel to at least one component (e.g., a combustor 20) of a respective one of the turbine engines 16. Alternatively, one fuel system 18 may deliver fuel to components of some or all of the turbine engines 16.

Referring again to FIG. 1, the airframe 14 includes a fuselage 22 and a plurality of wings 24 and 26. The wings include main or general lift wings 24 and stabilizer wings 26. The wings 24 are disposed on and connected to opposing sides of the fuselage 22. The wings 26 are disposed on and connected to opposing sides of a tail 28, which extends out from an aft portion of the fuselage 22. Each of the turbine engines 16 is mounted to a respective one of the wings by pylon structure 30.

Figure 3:
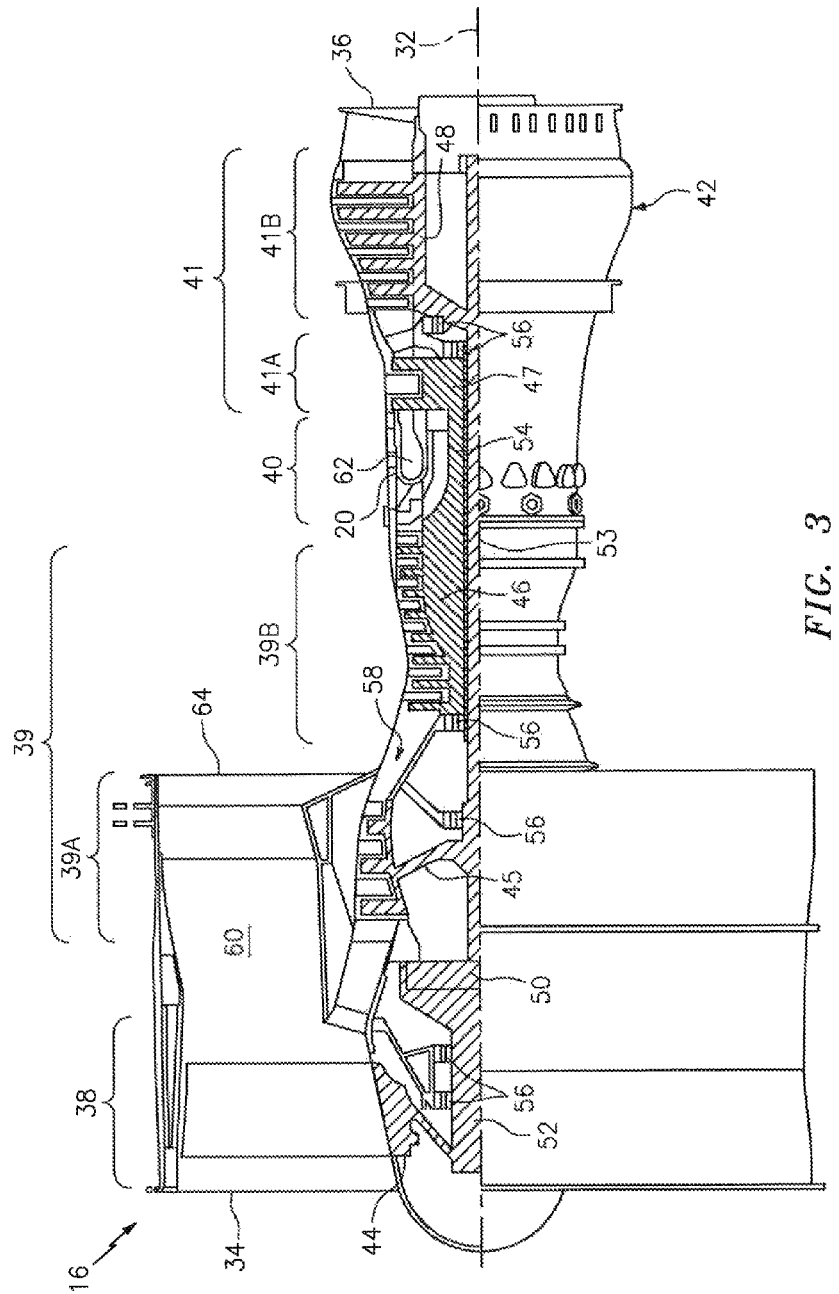
FIG. 3 is a side cutaway illustration of a geared turbofan engine for the aircraft.

FIG. 3 illustrates an exemplary embodiment of one of the turbine engines 16, which is configured as a geared turbine engine. This turbine engine 16 extends along an axial centerline 32 between an upstream airflow inlet 34 and a downstream airflow exhaust 36. The turbine engine 16 includes a fan section 38, a compressor section 39, a combustor section 40 and a turbine section 41. The compressor section 39 includes a low pressure compressor (LPC) section 39A and a high pressure compressor (HPC) section 39B. The turbine section 41 includes a high pressure turbine (HPT) section 41A and a low pressure turbine (LPT) section 41B.

The engine sections 38-41 are arranged sequentially along the centerline 32 within an engine housing 42. Each of the engine sections 38, 39A, 39B, 41A and 41B includes a respective rotor 44-48. Each of these rotors 44-48 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 44 is connected to a gear train 50, for example, through a fan shaft 52. The gear train 50 and the LPC rotor 45 are connected to and driven by the LPT rotor 48 through a low speed shaft 53. The HPC rotor 46 is connected to and driven by the HPT rotor 47 through a high speed shaft 54. The shafts 52-54 are rotatably supported by a plurality of bearings 56; e.g., rolling element and/or thrust bearings. Each of these bearings 56 is connected to the engine housing 42 by at least one stationary structure such as, for example, an annular support strut.

During operation, air enters the turbine engine 16 through the airflow inlet 34, and is directed through the fan section 38 and into a core gas path 58 and a bypass gas path 60. The air within the core gas path 58 may be referred to as "core air". The air within the bypass gas path 60 may be referred to as "bypass air". The core air is directed through the engine sections 39-41, and exits the turbine engine 16 through the airflow exhaust 36 to provide forward engine thrust. Within the combustor section 40, fuel is injected into a combustion chamber 62 and mixed with compressed core air. This fuel-core air mixture is ignited to power the turbine engine 16. The bypass air is directed through the bypass gas path 60 and out of the turbine engine 16 through a bypass nozzle 64 to provide additional forward engine thrust. This additional forward engine thrust may account for a majority (e.g., more than 70 percent) of total engine thrust. Alternatively, at least some of the bypass air may be directed out of the turbine engine 16 through a thrust reverser to provide reverse engine thrust.

Referring again to FIG. 2, the fuel system 18 includes a plurality of sub-systems. These sub-systems include a fuel source system 66 and a fuel management system 68. The fuel source system 66 may be an airframe-based system and arranged with the airframe 14 and, thus, remote of the turbine engine 16. The fuel management system 68, on the other hand, may be an engine-based system and arranged with the turbine engine 16 and, thus, remote of the airframe 14.

The fuel source system 66 includes a fuel reservoir 70, a pump 71, a fuel-to-fuel heat exchanger 72 and a flow regulator 73. Each of these components 70-73 may be located within the airframe 14; e.g., within the fuselage 22 and/or within a respective one of the wings 24. The fuel reservoir 70 includes at least one tank configured to contain a volume of fuel. The pump 71 may be configured as a boost pump; e.g., a centrifugal pump. The heat exchanger 72 includes a fuel supply flow path 74 and a fuel return flow path 76, where the flow paths 74 and 76 are fluidly discrete from one another. The flow regulator 73 may be configured as a valve, which may be mechanically or electrically actuated.

The fuel management system 68 includes a pump 78, an oil-to-fuel heat exchanger 79, a filter 80, a pump 81, a flow regulator 82 and a flow regulator 83 (or pressure regulator). The fuel management system 68 also include an injector or injector system 84 configured with the combustor 20 (see also FIG. 2). Each of the foregoing components 78-84 may be located with the turbine engine 16; e.g., within a nacelle 86 for the turbine engine 16 (see FIG. 1). The pump 78 may be configured as a boost pump; e.g., a centrifugal pump. The heat exchanger 79 includes a fuel flow path 86 and an oil flow path 88, where the flow paths 86 and 88 are fluidly discrete from one another. The pump 81 may be configured as a main pump; e.g., a gear pump. The flow regulator 82 may be configured as a valve (e.g., a metering valve), which may be mechanically or electrically actuated. The flow regulator 83 may be configured as a valve (e.g., a pressure relief valve), which may be mechanically or electrically actuated.

An outlet 90 of the fuel reservoir 70 is fluidly coupled with an inlet 92 of the pump 71. An outlet 94 of the pump 71 is fluidly coupled with an inlet 96 to the supply flow path 74. An outlet 98 of the supply flow path 74 is fluidly coupled with an inlet 100 of the pump 78. An outlet 102 of the pump 78 is fluidly coupled with an inlet 104 of the fuel flow path 86. An outlet 106 of the fuel flow path 86 is fluidly coupled with an inlet 108 of the filter 80. An outlet 110 of the filter 80 is fluidly coupled with an inlet 112 of the pump 81. An outlet 114 of the pump 81 is fluidly coupled with an inlet 116 of the flow regulator 82 and an inlet 118 of the flow regulator 83. An outlet 120 of the flow regulator 82 is fluidly coupled with an inlet 122 of the injector system 84. An outlet 124 of the flow regulator 83 is fluidly coupled with a junction between the outlet 106 and the inlet 108 as well as with an inlet 126 of the flow regulator 73. Thus, the flow regulator 83 is configured in parallel with the components 80 and 81. An outlet 128 of the flow regulator 73 is fluidly coupled with an inlet 130 to the return flow path 76. An outlet 132 of the return flow path 76 is fluidly coupled with an inlet 134 to the fuel reservoir 70. Thus, the flow paths 74 and 76 are configured in parallel between the fuel reservoir 70 and a junction between the components 81-83. An inlet 136 and an outlet 138 of the oil flow path 88 is fluidly coupled inline with and included in a lubrication and/or cooling system 140.

The above-described fluid couplings between the components 70-73 and 78-84 may be made (e.g., directly) through one or more fluid conduits; e.g., fuel lines. One or more of the fluid couplings between the components 70-73 and 78-84 may also or alternatively be made (e.g., indirectly) through one or more of other components. These other components may include one or more additional lubricant conditioning devices (e.g., filters, heat exchangers, etc.), lubricant monitoring devices (e.g., chip detectors, pressure sensors, temperature sensors, etc.), lubrication system components (e.g., reservoirs, gutters, manifolds, pumps, valves, etc.) and/or turbine engine components (e.g., heat exchangers, bearings, etc.). Furthermore, in some embodiments, the heat exchanger 72 may be formed integral with its fluid couplings.

During operation, supply fuel is pressurized and directed by the pumps 71, 78 and 81 from the fuel reservoir 70 to the injector system 84. Pressure and flow of the supply fuel provided to the injector system 84 is regulated by the flow regulator 82. Surplus fuel and fuel pressure may be relieved from the system 68 by the flow regulator 83. The flow regulator 83, for example, may divert some of the pressurized supply fuel back to the filter 80 as well as back to the fuel reservoir 70 as return fuel.

As the supply fuel is pressurized and directed to the injector system 84, the supply fuel is also heated by the heat exchanger 79. In particular, thermal energy is transferred from oil flowing through the oil flow path 88 to the supply fuel flowing through the fuel flow path 86. The return fuel flowing through the return flow path 76 therefore may have a higher temperature than the supply fuel flowing through the supply flow path 74. For example, the temperature of the supply fuel may be more than about forty degrees Fahrenheit (40° F.) (e.g., between ~100° F. and 300° F.) greater than the temperature of the return fuel. Thus, thermal energy is transferred from the return fuel to the supply fuel through the heat exchanger 72. This preheating of the supply fuel may serve to reduce heating demands on the heat exchanger 79 as well as reduce or prevent formation of ice and provision of this ice within the supply fuel to the fuel management system 68; e.g., the preheating may partially or completely melt ice within the supply fuel fluid couplings; e.g., lines. If not melted, such ice might clog or hinder operation of the fuel management system 68 as described above.

Figure 4:
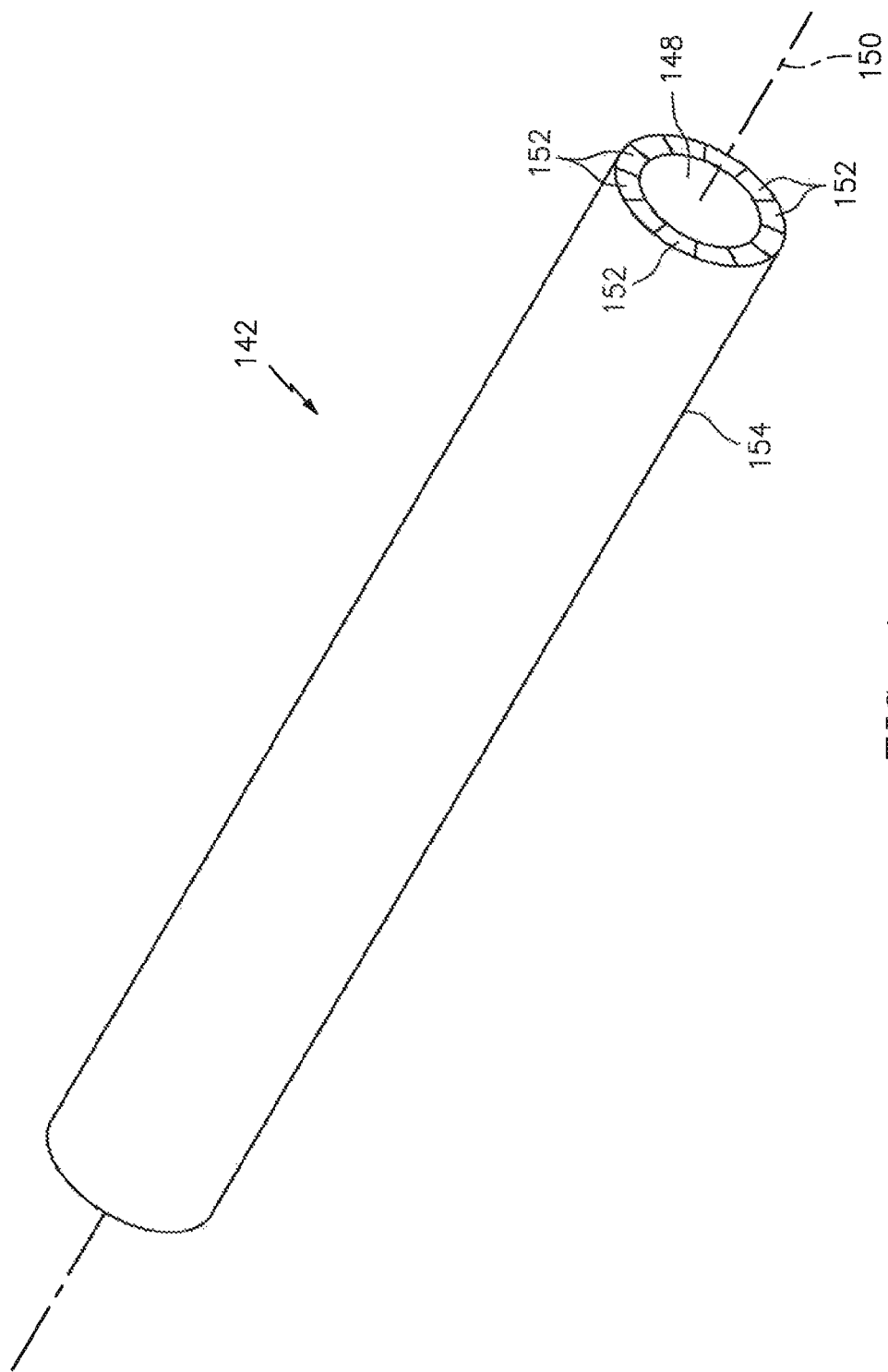
FIG. 4 is a perspective illustration of a heat exchanger conduit.
Figure 5:
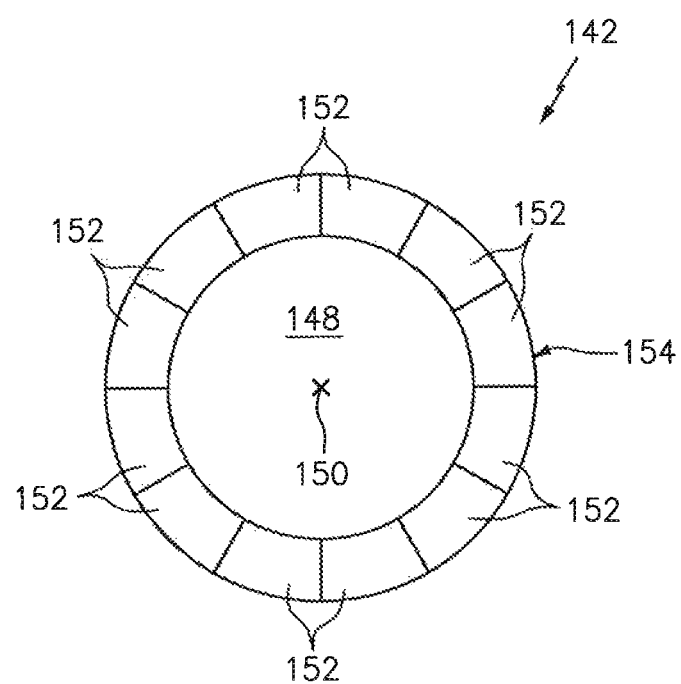
FIG. 5 is a cross-sectional illustration of the heat exchanger conduit.

The heat exchanger 72 of FIG. 2 includes a generally tubular conduit 142 connected between first and second manifolds 144 and 146. Referring to FIGS. 4 and 5, the conduit 142 has a central bore 148, which extends longitudinally through the conduit 142 along a centerline 150. The conduit 142 also has one or more channels 152, which are embedded within a sidewall 154 of the conduit 142 which forms the bore 148. Each of the channels 152 extends longitudinally through the sidewall 154. The bore 148 may extend through the manifolds 144 and 146 (see FIG. 2) to the inlet 96 and the outlet 98. The channels 152 may be fluidly coupled with the inlet 130 and the outlet 132 (see FIG. 2) through respective annular cavities in the manifolds 146 and 144.

The heat exchanger 72 may have various configurations other than that described above with respect to FIGS. 4 and 5. In addition, the heat exchanger 72 may be configured as a counter-flow heat exchanger as illustrated in FIG. 2. Alternatively, the heat exchanger 72 may be configured as a parallel-flow heat exchanger or a cross-flow heat exchanger. The present disclosure therefore is not limited to any particular heat exchanger 72 configurations.

It is worth noting, the fuel system 18 may include additional components other than those described above. Such additional components may include, but are not limited to, additional filters, pumps, heat exchangers, manifolds, valves, fuel monitoring devices (e.g., sensors), etc. Some of the components described above may also be omitted in alternative embodiments. The present disclosure therefore is not limited to any particular fuel system 18 configurations or components.

The aircraft 12 is described herein and illustrated as having a typical passenger/cargo aircraft configuration for ease of description; however, the present disclosure is not limited to any particular aircraft configurations. The wings 24, for example, may alternatively be connected to a gravitational mid or top portion of the fuselage 22 rather than a gravitational bottom portion of the fuselage 22 as illustrated in FIG. 1. One or more of the turbine engines 16 may each be mounted elsewhere with the airframe 14; e.g., mid-wing, above wing, to another wing, to a side of the fuselage 22, etc. The aircraft system 10 may also include a different number of turbine engines 16 than illustrated in FIG. 1; e.g., a single turbine engine or dual turbine engines for each wing.

In addition to the foregoing, the fuel system 18 may be configured with various turbine engine types other than that described above. The fuel system 18, for example, may be configured with a geared turbine engine where a gear train connects one or more shafts to one or more rotors in a fan section, a compressor section and/or any other engine section. Alternatively, the fuel system 18 may be configured with a turbine engine configured without a gear train. The fuel system 18 may be configured with a geared or non-geared turbine engine including a single spool, with two spools (e.g., see FIG. 3), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An aircraft system, comprising:
   a fuel reservoir;
   a turbine engine; and
   a fuel-to-fuel heat exchanger fluidly coupled between the fuel reservoir and the turbine engine, wherein the heat exchanger is adapted to direct supply fuel from the fuel reservoir to the turbine engine, and the heat exchanger is further adapted to direct return fuel from the turbine engine to the fuel reservoirs;
   wherein the fuel-to-fuel heat exchanger comprises a supply flow path and a return flow path;
   wherein the supply flow path is fluidly coupled between an outlet of the fuel reservoir and an inlet of the turbine engine and is adapted to direct the supply fuel from the fuel reservoir to the turbine engine;
   wherein the return flow path is fluidly coupled between an inlet of the fuel reservoir and an outlet of the turbine engine and is adapted to direct the return fuel from the turbine engine to the fuel reservoir; and
   wherein the supply flow path and the return flow path are configured fluidly in parallel between the fuel reservoir and the turbine engine through the heat exchanger.

2. The aircraft system of claim 1, wherein the heat exchanger is a counter-flow heat exchanger.

3. The aircraft system of claim 1, wherein
   the heat exchanger includes a first flow path and a second flow path; and
   the first flow path and the second flow path are fluidly coupled in parallel between the fuel reservoir and a component of the turbine engine.

4. The aircraft system of claim 1, wherein the heat exchanger includes a first flow path and a second flow path with a plurality of sub-flow paths distributed about the first flow path.

5. The aircraft system of claim 1, wherein the heat exchanger comprises a conduit including a central bore and a plurality of channels, and the channels are embedded within a sidewall of the conduit.

6. The aircraft system of claim 5, wherein the heat exchanger further comprises a first manifold and a second manifold, and the channels extend between the first manifold and the second manifold.

7. The aircraft system of claim 5, wherein
the turbine engine comprises a fuel management system including an inlet and an outlet;
the inlet is fluidly coupled with the bore; and
the outlet is fluidly coupled with the channels.

8. The aircraft system of claim 1, further comprising an airframe, wherein the heat exchanger is arranged within the airframe and the turbine engine is attached to the airframe.

9. The aircraft system of claim 1, wherein the heat exchanger is remotely located from the turbine engine.

10. An aircraft system, comprising:
a fuel reservoir;
a fuel management system including a boost pump, a main pump and an injector; and
a fuel-to-fuel heat exchanger fluidly coupled between the fuel reservoir and the fuel management system;
wherein the heat exchanger includes a supply flow path and a return flow path, and the supply flow path and the return flow path are fluidly coupled in parallel between the fuel reservoir and the fuel management system through the heat exchanger;
wherein the supply flow path is fluidly coupled between an outlet of the fuel reservoir and an inlet of the fuel management system and is adapted to direct the supply fuel from the fuel reservoir to the fuel management system; and
wherein the return flow path is fluidly coupled between an inlet of the fuel reservoir and an outlet of the fuel management system and is adapted to direct the return fuel from the fuel management system to the fuel reservoir.

11. The aircraft system of claim 10, further comprising a turbine engine that includes the fuel management system, wherein the heat exchanger is remotely located from the turbine engine.

12. The aircraft system of claim 10, further comprising an airframe within which the heat exchanger is configured.

13. An aircraft system, comprising:
a fuel reservoir;
a turbine engine; and
a fuel-to-fuel heat exchanger including a supply flow path and a return flow path, wherein the supply flow path and the return flow path are fluidly coupled in parallel between the fuel reservoir and a component of the turbine engine through the heat exchanger;
wherein the supply flow path is fluidly coupled between an outlet of the fuel reservoir and an inlet of the turbine engine and is adapted to direct the supply fuel from the fuel reservoir to the turbine engine; and
wherein the return flow path is fluidly coupled between an inlet of the fuel reservoir and an outlet of the turbine engine and is adapted to direct the return fuel from the turbine engine to the fuel reservoir.

14. The aircraft system of claim 13, wherein the heat exchanger is remotely located from the turbine engine.

15. The aircraft system of claim 13, further comprising an airframe, wherein the heat exchanger is arranged within the airframe and the turbine engine is mounted to the airframe.

* * * * *